March 31, 1970
J. DE LA CIERVA ETAL
3,503,663
GYROSCOPICALLY CONTROLLED MOTION
COMPENSATOR FOR OPTICAL DEVICES
Filed Jan. 6, 1964
2 Sheets-Sheet 1
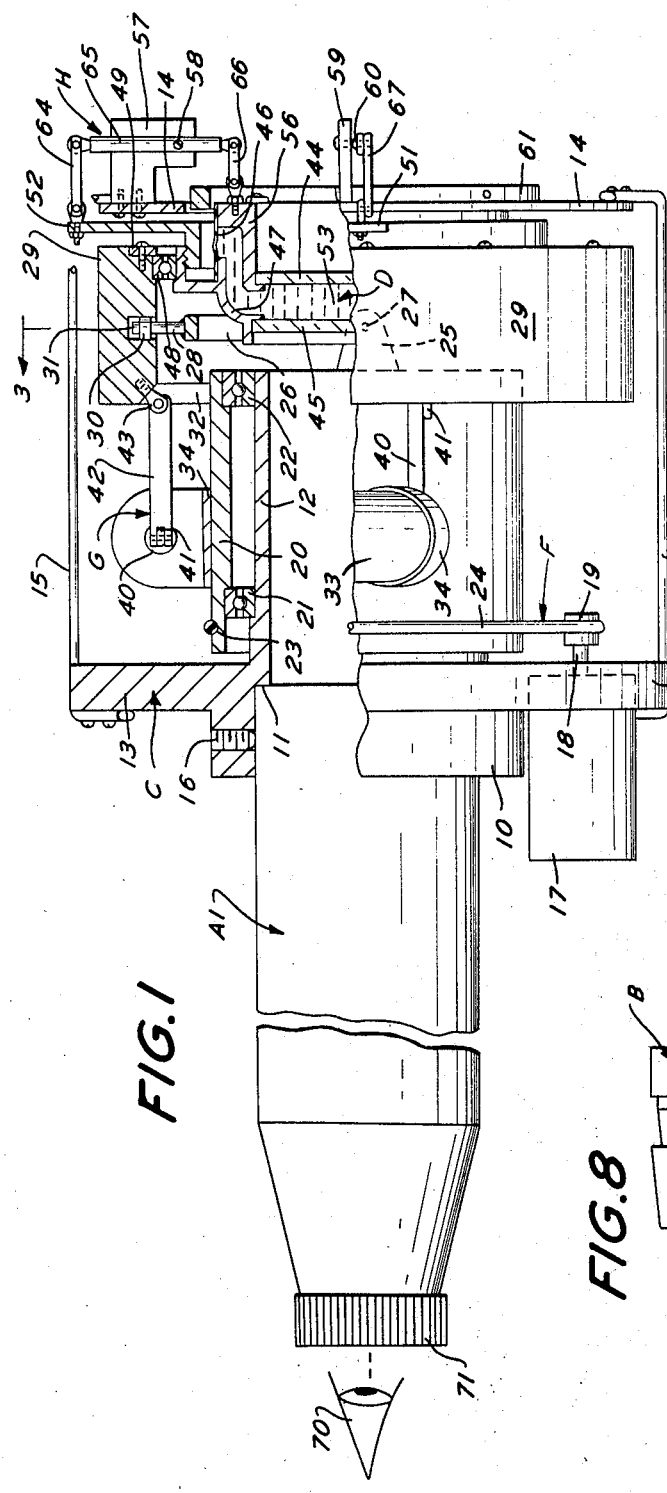
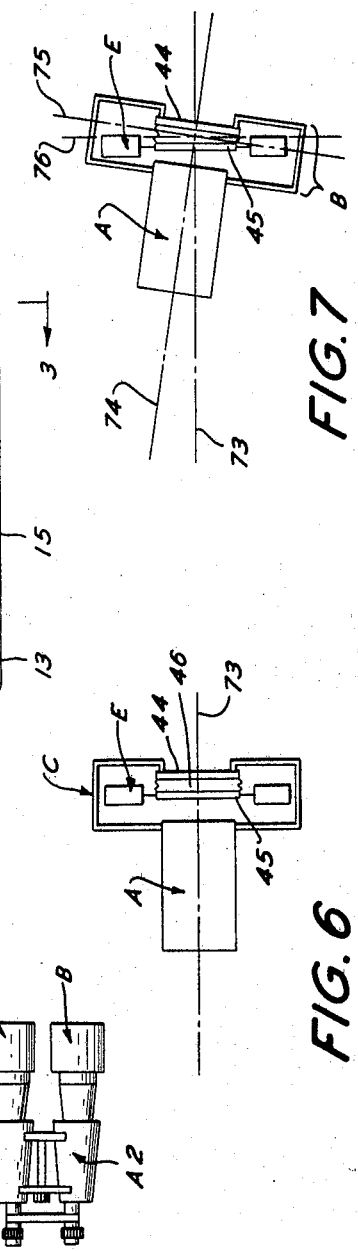
INVENTORS
LEONARD GOLAND
JUAN DE LA CIERVA
BY
Bilker + Moyerman.
ATTORNEYS.

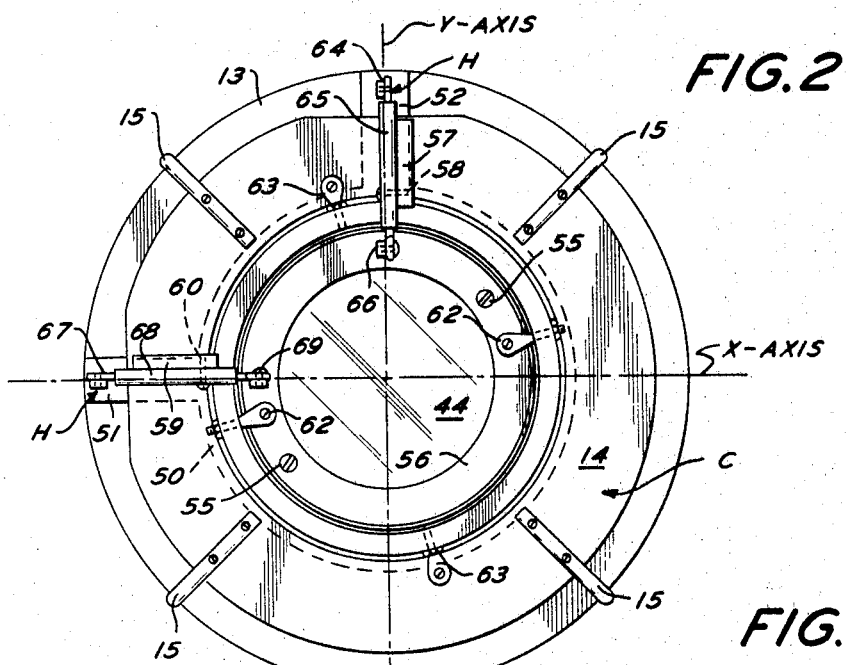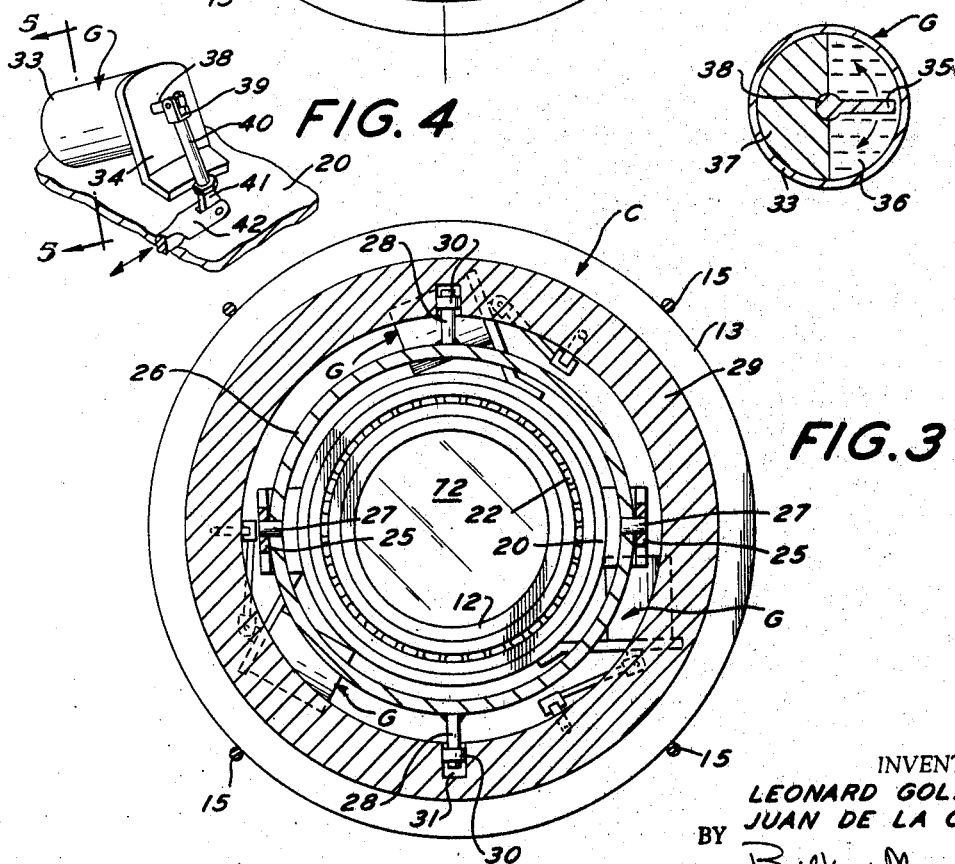

United States Patent Office 3,503,663
Patented Mar. 31, 1970

3,503,663
GYROSCOPICALLY CONTROLLED MOTION COMPENSATOR FOR OPTICAL DEVICES
Juan de la Cierva, Philadelphia, and Leonard Goland, Meadowbrook, Pa., assignors to Dynasciences Corporation, Fort Washington, Pa., a corporation of Pennsylvania
Filed Jan. 6, 1964, Ser. No. 335,961
Int. Cl. G02b 23/00
U.S. Cl. 350—16
9 Claims

ABSTRACT OF THE DISCLOSURE

Image stabilizer for optical systems comprising a variable-angle fluid wedge enclosed between transparent plates actuated by gyroscopic mass spinning on an axis substantially coincident with optical system axis. Gyroscopic mass is linked mechanically along mutually perpendicular axes to the plates and to optical system. Dampers allow only substantially high frequency movement to angularly displace spin axis with respect to optical system thereby causing the fluid wedge formed to deviate light beam compensatory to such rapid motion between optical system and target but permit low frequency scanning motion without relative displacement of the spin and collimation axes.

---

This invention relates to a motion compensating device for high-powered optical systems and, more particularly, relates to a device for stabilizing and nullifying the effects of external vibrations and motions upon the image of such optical systems. The invention is especially useful in connection with optical fire control, photographic, navigational and reconnaissance devices mounted in or upon aircraft, land vehicles, boats, satellites and space craft.

In prior U.S. patent application Ser. No. 239,533, filed on Nov. 23, 1962 by Juan de la Cierva on an image motion compensator, now U.S. Patent No. 3,212,420, there is described a variable-angled, fluid-filled, prism which is formed by two transparent plates whose motions are controlled so that the optical path of an image is bent and deviated by the prism. This prism may be used as the variable-geometry image-displacement optical system of the instant invention and the embodiment discussed herein utilizes it.

The purpose of the variable-geometry prism as described in the application was to compensate particularly for aerial camera motions not only the ordinary longitudinal flight velocity of aircraft, its inherent vibrations with respect to the object being photographed, but also vehicular angular motions such as roll, pitch, and yaw. That is, aerial and space reconnaissance requires a highly refined form of photography which is capable of producing undistorted, precision quality images with optimum resolution characteristics and minimum scale or deviational error. To obtain this fine photographic quality, it was necessary to minimize any relative motion between the camera and the object under observation during the exposure time, since such motion produced image displacement at the focal plane with corresponding degradation in image resolution quality.

The angle of the prism, as well as the azimuth of its arris was controlled by a symbolically represented servo system into which was fed flight information so that the optical path of the image was bent by the prismatic wedge a prescribed amount in the correct azimuth. The amount, direction and rate of camera tilt was metered by appropriate sensors located in the camera body, and served as the input signal to the servo system which actuated the orientation of the fluid-filled prismatic wedge. The relative angular position of the transparent plates was controlled by two sets of actuators, each providing linear push-pull action so that when one actuator of a set expanded the other corresponding actuator in that set contracted and in such a manner that the angular displacement of the image was held to zero.

In the present invention, a variable-geometry image-displacement optical system, such as for example the planar system described above, is controlled by linkages from a gyroscopic device. The output forces of the gyroscope are a function of the vibrational or other displacement forces for which compensation is desired and these are the forces transmitted to the optical system. Other optical systems including non-planar and reflective systems can be utilized in the same manner.

Accordingly, it is an object of the invention to provide a gyroscopically controlled motion compensator which can be mounted on and in front of independent optical devices such as periscopes, telescopes, binoculars, television equipment, cameras and the like to keep the apparent image of these devices free from vibration and sudden angular displacement to which they may be subjected.

An additional object of the invention is to provide a gyroscopically controlled motion compensator wherein spin axis of the gyro mass is aligned with the longitudinal axis of the compensator and the mass is gimballed for two degrees of freedom.

A further object of the invention is to provide a device which can be used with high magnification optical devices mounted on platforms subject to vibration and rapid angular displacements, such platforms including ships, planes, land vehicles, missiles, space vehicles and the like, and which will negate the effect of such motions on the apparent image seen through the optical devices.

It is still another object of the invention to provide a gyroscopic motion optical compensator wherein the gyro mass can be selectively damped so as to cause an optical correction for vibrations above a predetermined frequency but to cause substantially no compensation for low frequency vibration including motion characteristic of scanning.

It is also an object of the invention to provide a gyroscopically controlled motion compensator in the form of a small, portable lightweight package which can be mounted directly upon and in front of independent optical instruments without making the resultant combination unwieldy or bulky.

Other objects of the invention are to provide a device of the character described that is easily and economically produced, which is sturdy in construction, which is highly efficient in operation and is capable of long periods of dependable maintenance-free performance.

These and related objects of the invention will be apparent to those skilled in the art from a consideration of the discussion which follows when read in conjunction with the accompanying drawings wherein:

FIGURE 1 represents a fragmentary side view, partially in section, of a motion compensator of the invention mounted on an independent optical device.

FIGURE 2 represents an end elevation of the embodiment of the invention shown in FIGURE 1.

FIGURE 3 represents a section taken on line 3—3 of FIGURE 1.

FIGURE 4 represents a fragmentary perspective view of a damper, of a type which may be used in the embodiment of the invention which will be described, shown as it is mounted on the compensator of FIGURE 1.

FIGURE 5 represents a section taken on line 5—5 of FIGURE 4.

FIGURE 6 is a diagrammatic representation of a motion compensator of the invention prior to sudden angular deviation of the optical device in connection with which it is being used, and on which it is mounted.

FIGURE 7 is a diagrammatic representation, similar to FIGURE 6, indicating the conditions existing after deviation of the optical device has occurred.

FIGURE 8 is a plan view of the invention as it may be used in connection with a pair of conventional binoculars.

Referring now to the drawings, wherein like reference numerals and letters indicate like parts, it will be observed that the motion compensator of the invention is intended for use with independent optical devices A such as, for instance, telescope A1, and binoculars A2. The compensator itself, generally B, comprises a longitudinally extending housing C adapted to be mounted on devices A1. The housing contains an optical system, such as the variable-geometry image-displacement planar system D and also serves as a mount for a gyroscope E, gyroscope drive means F, and gyroscope damper means G. Linkages H are provided between the gyroscope E and optical system D so that the forces of the damped gyroscopic mass can be transmitted to the image-displacement optical system. Before indicating the logic of the invention, vis-a-vis FIGURES 6 and 7, which will enable those skilled in the art to appreciate the permutations and variations which are possible, the embodiment shown in FIGURES 1 to 4 inclusive will be described in detail.

As shown in FIGURES 1 to 3, the housing C comprises a generally hollow, longitudinally extending cylinder 10, shouldered at 11 to a portion of reduced internal diameter 12. Intermediate portions 11 and 12 an integral transverse flange 13 may be provided. Also part of the housing is front support ring 14, coaxially fixed and longitudinally spaced from flange 13 by a plurality of tie rods 15, suitably affixed to both the ring and the flange. Housing C may also be provided with a plurality of set screws 16, or other equivalent clamping means, for releasably retaining optical device A1 within cylinder portion 10, abutting shoulder 11.

The gyroscope drive means F, which is carried by housing C includes a motor 17 which can be mounted conventionally on flange 13. The motor may be of any type, electrical or fluid powered and for large gyro masses a plurality of motors may be used. The motor shaft 18 may conveniently be provided with a sheave 19. Rotary motion is transmitted to the gyro mass by a drive sleeve 20 which is coaxially and spinably mounted upon housing portion 12 by suitable bearings such as proximal bearing assembly 21 and distal bearing assembly 22, which may be longitudinally retained in any conventional manner. The sleeve is provided with an integral traction groove 23 in which a drive belt 24, extending from sheave 19, is retained. The distal end of drive sleeve 20 is provided with a pair of journal tabs 25, spaced 180° apart, and their journal points define the inner gimbal axis of the gyro.

The gyroscope E comprises a gimbal ring 26 having a pair of inner axis trunnions 27, 180° apart, and a pair of outer gimbal axis trunnions 28 which are 90° removed from trunnions 27. The annular gyro mass 29 is mounted on trunnions 28 with pivots 30 which are suitably retained in apertures 31 provided in the mass 29. It is thus seen that gyro E is gimballed for two degrees of freedom and has a spin axis, as shown in FIGURE 1, which is substantially coincident with the longitudinal axis of housing C. The mass 29, while it must spin around the housing, may be of any weight or configuration and consequently the term annular as used in connection therewith is not limited to perfect rings. Mass 29 is further provided with a proximal beveled face 32 against which damping forces are applied.

The damping means G, as exemplified in FIGURES 1, 3, 4, and 5 is unique in that it spins with the gyro mass 29 and exerts no forces as long as the plane of the mass is perpendicular to the axis of sleeve 20. As shown, three damper bodies 33 are mounted 120° apart on drive sleeve 29 with damper brackets 34. The dampers used in this embodiment of the invention are of the rotary viscous type and obtain their damping effect from the coaction of internal vanes 35 and damping fluid 36 contained within body 33. Such dampers can be obtained with damping rates from 0.2 to 25 in. lb./rad./sec. and with friction torque of about 1 oz. inch. A suitable damper is that sold as Model 1080–100 by Sesco Manufacturing, Inc. of Bridgeport, Pa., and fully described in their Bulletin 862. Other suitable viscous dampers may be used including dash pot types and aerodynamic torquers provided only that they spin with the gyro mass. The particular damper used is determined by the damping constant required for a given application. As shown in FIGURE 5 the travel of vane 35 is limited by stop 37 to 180° and the vane can reciprocate as shown by the arrows. The damping forces are transmitted to the gyro mass via a shaft 38, which is a continuation of vane 35, and a linkage including a connector 39, a first arm 40, a pivotal connector 41, a second arm 42 and a pivotal connector 43, which connects arm 42 and gyro mass surface 32. Arm 42 can be reciprocated, as shown by the arrows in FIGURE 4, thus transmitting damping forces to mass 29.

The optical system D which is illustrated in the particular embodiment of the invention being discussed is of the fluid-filled prism type discussed above. It includes a distal transparent plate 44 and a proximal transparent plate 45 which are connected by a liquid-tight bellows 46. Proximal plate 45 is mounted in a generally annular proximal plate holder 47 which is mounted on and moves with the gyro mass 29 but does not spin with it. The holder 47 is mounted on the mass with a pressed bearing assembly 48, the spinning portion of which may be affixed to the mass 29 with a retention ring 49. The bearing assembly, while providing support for holder 47, also insulates it from gyro spin. Threadedly retained on holder 47 is a follower ring 50 which includes two tabs, 51 and 52, spaced 90° apart and located, respectively, on the X and Y axis of the compensator. The liquid-tight cavity between plates 44 and 45 is filled with a fluid 53 having an appropriate index of refraction which may be added or removed through fill and vent plugs 55 in the face of pivotally mounted distal plate holder 56.

Plate 45 moves directly with the gyro mass. Motion transverse to that of the gyro mass 29 is transmitted to pivotally mounted plate holder 56 and its plate 44 by linkages H. Separate systems are provided for X and Y motion components. A Y-bracket 57 is mounted on ring 14 to provide a Y-pivot point 58. In a similar manner, an X-bracket 59 is mounted, 90° away from bracket 57, on ring 14 to provide an X-pivot point 60. Holder 56 is pivotally mounted, within a pivot ring 61 by a pair of diametrically opposed internal pivots 62. Ring 61 is, in turn, pivotally mounted on support ring 14 with a pair of diametrically opposed pivots 63, 90° out of registration with pivots 62. Holder 56 is thus retained with two degrees of pivotal freedom. Y motion of tab 52 is transmitted to holder 56 by a crank system including arms 64, 65 and 66 operating about pivot point 58. X motion of tab 51 is transmitted to holder 56, in an analagous manner, by a crank system including arms 67, 68 and 69 operating about pivot point 60. Thus motion of the gyro mass changes the prism angle of optical system D.

In operation an observer 70 uses telescope A1 in a conventional manner making his observations through eyepiece 71 and the objective 72 if the telescope's collimated optical system.

Where there is no vibratory motion of the optical instrument, as diagrammed in FGIURE 6, plates 44 and 45 are both normal to the optical axis 73. Light passing through them is, consequently not deviated. This is a generalized statement of the invention because, since the generalized index of the liquid 53 may be changed, it is possible to achieve such non-deviation of the optical axis with plates either or neither of which is normal to the axis. Further, since non-planar or reflective surfaces are within the scope of the invention there is no necessary single physical relationship between position of compensator optical elements and their optical axis, the sole desideratum being that there be no net effect of the compensator on the optical axis of the independent optical device A under the static conditions represented in FIGURE 6.

FIGURE 7 is a generalized representation of the invention under "tilt" conditions wherein the optical instrument A and compensator B have experienced a sudden angular deviation to a new axis 74 which, absent the compensator, would result in loss of images of objects out along axis 73. However, gyroscope E, acting upon plate 45 maintains this plate in the position it had before deviation. In FIGURE 7 (unlike the embodiment in FIGURES 1 to 5) plate 44 is shown rigidly mounted with respect to instrument A and it thus remains in a plane 75 which is normal to plane 74. However, gyro stabilized plate 45 remains in the plate 76, where it had been prior to deviation. The angle between 73 and 74 will thus equal the angle between 75 and 76. Where the refractive index of liquid 53 is 2, the deviation of the prism will also be equal to the prism angle. Consequently, the deviation of the prism will be equal to the telescope deviation and the apparent line of sight of the resultant system will remain unchanged at 74 even though the object being viewed is along line 73, the image deviation occurring in the compensator.

As indicated above, the embodiment shown in FIGURES 1 to 5 differs from that diagrammed in FIGURES 6 and 7. In the former both plates 44 and 45 move with the gyro mass—plate 44 moving directly and plate 45 inversely. Such an embodiment allows use of refractive fluids with lower indices. Since the movement between plates is multiplied by the linkage shown the liquid need not have so high a refractive index as where all correction motion is confined to one plate.

The compensator is preferably designed to be effective only at high tilt rates, while being inoperative at low tilt rates. Thus where the telescope moves at a low rate of angular speed—such as in scanning under operator control—the gyro correction does not occur and the optical axis of the resultant system follows the movement of the telescope. However, if the telescope is moved at high rates of angular speed, such as during vibration the compensator optical system will produce a fully compensatory deviation. The responsiveness of the gyroscope to given frequency is a function of the constants of dampers G and the invention of the gyro mass 29. Consequently the system can be designed to provide increasing compensation with increasing rates of tilt beginning at any preselected frequency by selection of damper constants and gyro mass.

FIGURE 8 shows two compensators B mounted on a pair of binoculars A2. Such units could be lightweight with battery powered gyro motors.

Although the invention has been described in considerable detail, the description is intended to be illustrative rather than limiting, since the invention may be variously embodied. Consequently, its scope is to be determined only by the appended claims.

Having described our invention, we claim:

1. Image stabilization means for an optical system subject to random angular motion comprising:
   (a) spaced transparent elements disposed transverse to the axis of collimation defined by the optical system and including a transparent fluid medium encapsulated therebetween,
   (b) means for pivotally supporting said transverse transparent elements along mutually perpendicular axes in quadrature to the axis of collimation to define a variable-angle fluid wedge,
   (c) a rotating gyroscopic mass spinning about an axis substantially coextensive with the axis of collimation,
   (d) linkage means coupling said transparent elements rectilinearly with said gyroscopic mass along mutually perpendicular axes,
   (e) means mechanically coupling said spinning gyroscopic mass with said optical system, and
   (f) damping means rotatable with and coupling said gyroscopic mass with said optical system and allowing high frequency angular motion of the optical system with respect to its object target to angularly displace the axis of collimation with respect to the spin axis of the gyroscopic mass whereby the formed variable-angle fluid wedge will deflect the line of sight compensatory to said motion, and permitting the spin axis to follow the axis of collimation during relatively low frequency motion of the optical system with respect to the target in order to scan.

2. The image stabilization means of claim 1 wherein said damping means constitute viscous liquids.

3. The image stabilization means of claim 2 wherein said damping means include vanes pivotally supported in the viscous liquid.

4. The image stabilization means of claim 1 wherein said mechanical coupling means (e) comprises a gimbal ring.

5. The image stabilization means of claim 4 wherein said mechanical coupling means (b) pivotally supporting said transparent plates comprises a gimbal mount.

6. An image motion stabilizer for an optical system comprising a variable angle fluid wedge enclosed between and perimetrically defined by transparent plates interposed transverse to the axis of collimation of the optical system, a rotating gyroscopic mass spinning about an axis substantially coextensive with the axis of collimation, means mechanically linking said rotating gyroscopic mass along mutually perpendicular axes to the transparent plates and gimbal means linking said gyroscopic mass to the optical system, and means for damping relative angular between the spin axis and the axis of collimation, said means for damping being rotatable with said spinning gyroscopic mass, whereby relatively low frequency motion therebetween will allow the spin axis to remain coincident with the axis of collimation so as to maintain said plates in plane parallel disposition for scanning purposes and whereby relatively high frequency motion therebetween will effect angular displacement between said spin and collimation axes and cause the formation of a wedge in the fluid medium sufficient to deflect the line of sight compensatory to such motion.

7. The invention of claim 6 wherein said mechanical linking means comprise gimbal mounts.

8. An image motion stabilizer for an optical system comprising a variable angle fluid wedge including a pair of transparent plates and a fluid medium encapsulated therebetween, a rotating gyroscopic mass spinning about an axis substantially coextensive with the optical axis of the optical system, means constituting gimbals coupling said rotating gyroscopic mass with the optical system, means constituting gimbals coupling said transparent plates with respect to each other and to the rotating gyroscopic mass, and damping means rotatable with and coupling said gyroscopic mass to said optical system whereby relatively high frequency motion between the optical system and its target objective will cause angular displacement of the optical axis with respect to the spin axis and deflect the line of sight compensatory to such motion while relatively low frequency motion will allow the spin axis to follow the optical axis for scanning purposes.

9. An image motion stabilizer for an optical system comprising variable-angle wedge means constituting a fluid medium encapsulated between transparent plates interposed transverse to the optical axis of collimation of the optical system, a gyroscope mass spinning about an axis substantially coextensive with the optical axis, means mechanically linking said spinning gyroscope mass pivotally to said plates and to said optical system along axes transverse to the optical axis, and means rotatable with said gyroscopic mass for damping relative angular motion between the spin axis and the optical axis whereby relatively low frequency motion therebetween will permit the spin axis to remain coincident with the optical axis so as to maintain said plates in plane-parallel disposition for target scanning purposes and whereby relatively high frequency motion therebetween will produce angular displacement between said spin and optical axes and form a fluid wedge between said plates sufficient to deflect the line of sight compensatory to such motion.

References Cited

UNITED STATES PATENTS

| | | | |
|---|---|---|---|
| 1,402,064 | 1/1922 | Gray. | |
| 1,460,627 | 7/1923 | Weaver. | |
| 1,586,070 | 5/1926 | Cooke. | |
| 1,709,314 | 4/1929 | Henderson | 88—1 |
| 2,507,459 | 5/1950 | Sandvik et al. | |
| 2,570,130 | 10/1951 | Kenyon. | |
| 2,811,042 | 10/1957 | Kenyon. | |
| 3,035,477 | 5/1962 | Bosch et al. | 88—1 |
| 3,152,207 | 10/1964 | Emmerich | 88—1 |
| 3,212,420 | 10/1965 | De la Cierva | 350—285 X |
| 3,378,326 | 4/1968 | Aluarez | 350—16 |

DAVID SCHONBERG, Primary Examiner

T. H. KUSMER, Assistant Examiner

U.S. Cl. X.R.

95—12.5; 350—287